United States Patent [19]
Lawson

[11] Patent Number: 5,442,436
[45] Date of Patent: Aug. 15, 1995

[54] REFLECTIVE COLLIMATOR

[75] Inventor: William E. Lawson, Somerset, Wis.

[73] Assignee: Laser Machining, Inc., Somerset, Wis.

[21] Appl. No.: 188,102

[22] Filed: Jan. 27, 1994

Related U.S. Application Data

[63] Continuation of Ser. No. 831,428, Feb. 5, 1992, abandoned.

[51] Int. Cl.⁶ ............................................. G01B 11/26
[52] U.S. Cl. .................................................. 356/153
[58] Field of Search ................... 356/153–154, 356/138; 359/641, 858, 365; 372/99

[56] References Cited

U.S. PATENT DOCUMENTS

| | | | |
|---|---|---|---|
| 3,296,923 | 1/1967 | Miles | 88/24 |
| 3,407,294 | 10/1968 | Hill | 240/46 |
| 3,541,323 | 11/1970 | Stewart et al. | 240/46 |
| 3,710,098 | 1/1973 | Walden | 240/49 |
| 3,785,738 | 1/1974 | Hoppke | 356/138 |
| 4,109,304 | 8/1978 | Khvalovsky et al. | 362/259 |
| 4,196,461 | 4/1980 | Geary | 362/259 |
| 4,674,011 | 6/1987 | Patton et al. | 362/32 |
| 5,020,906 | 6/1991 | Paz | 356/138 |
| 5,052,017 | 9/1991 | Hobart et al. | 372/99 |

OTHER PUBLICATIONS

Paper Entitled "Typical Solutions for Beam-Expanders", by Kugler.

Primary Examiner—Richard A. Rosenberger
Assistant Examiner—K. P. Hantis
Attorney, Agent, or Firm—Kinney & Lange

[57] ABSTRACT

A reflective collimator adjusts an input light beam producing an output light beam parallel to the input light beam. The input light beam is reflected and focused by a first reflector to a second reflector, then reflected from the second reflector to a third reflector, and reflected from the third reflector to a fourth reflector, and finally reflected and focused from the fourth reflector to a focus point.

18 Claims, 2 Drawing Sheets

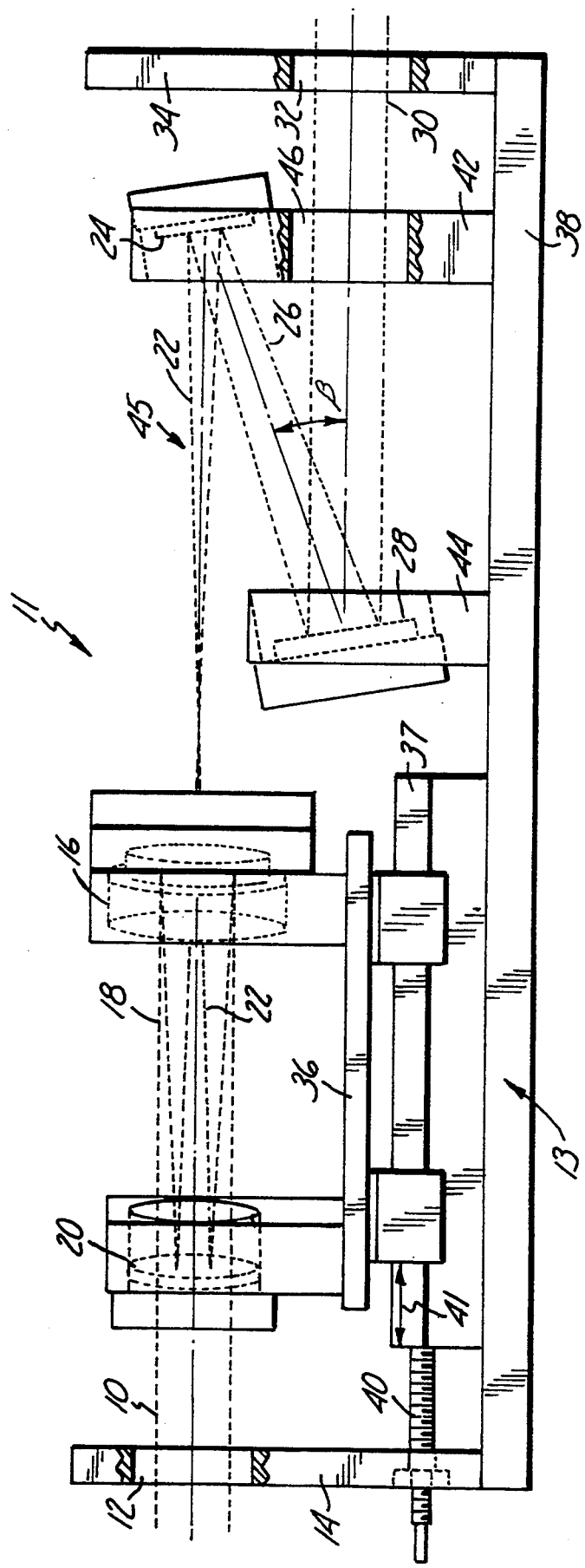

REFLECTIVE COLLIMATOR

This is a Continuation application under 37 CFR § 1.62 of application Ser. No. 07/831,428, filed Feb. 5, 1992, now abandoned.

BACKGROUND OF THE INVENTION

The invention relates generally to laser devices and, in particular, to a laser beam delivery system.

A laser beam diverges as the beam is sent from the laser source. Consequently, laser delivery systems use collimators to adjust the divergence of the beam. Generally, a collimator adjusts laser light to produce parallel rays of light. The collimator also can control the beam spread, so that the desired beam size occurs at the focusing element.

Low power laser systems tend to use collimator lenses to collimate laser beam. The Walden U.S. Pat. No. 3,710,098 and the Hill U.S. Pat. No. 3,407,294 disclose methods of delivering laser light using lenses. Both patents disclose methods of moving the lenses to vary the divergence of the output beam.

Higher power lasers tend to use reflective collimators to collimate the laser beam. The Paz U.S. Pat. No. 5,020,906 discloses a reflective collimator using either a single spherical mirror or a parabolic mirror. The Stewart et al. U.S. Pat. No. 3,541,323 discloses a parabolic mirror to project a laser beam. The Stewart patent further provides for adjusting the divergence of the output beam with a variable expanding optic system such as zoom optics.

SUMMARY OF THE INVENTION

The present invention includes a reflective collimator that adjusts an input light beam. The input light beam is first reflected and focused off a first reflector to a second reflector. The second reflector reflects the light beam to a third reflector. The third reflector reflects the light beam to a fourth reflector. The fourth reflector reflects and focuses the light beam approximately parallel to an output light beam. The output light beam is parallel to the direction of the input light beam.

BRIEF DESCRIPTION OF THE DRAWINGS

FIG. 2 is a side view of the present invention.

DETAILED DESCRIPTION OF THE PREFERRED EMBODIMENTS

Figure 1:
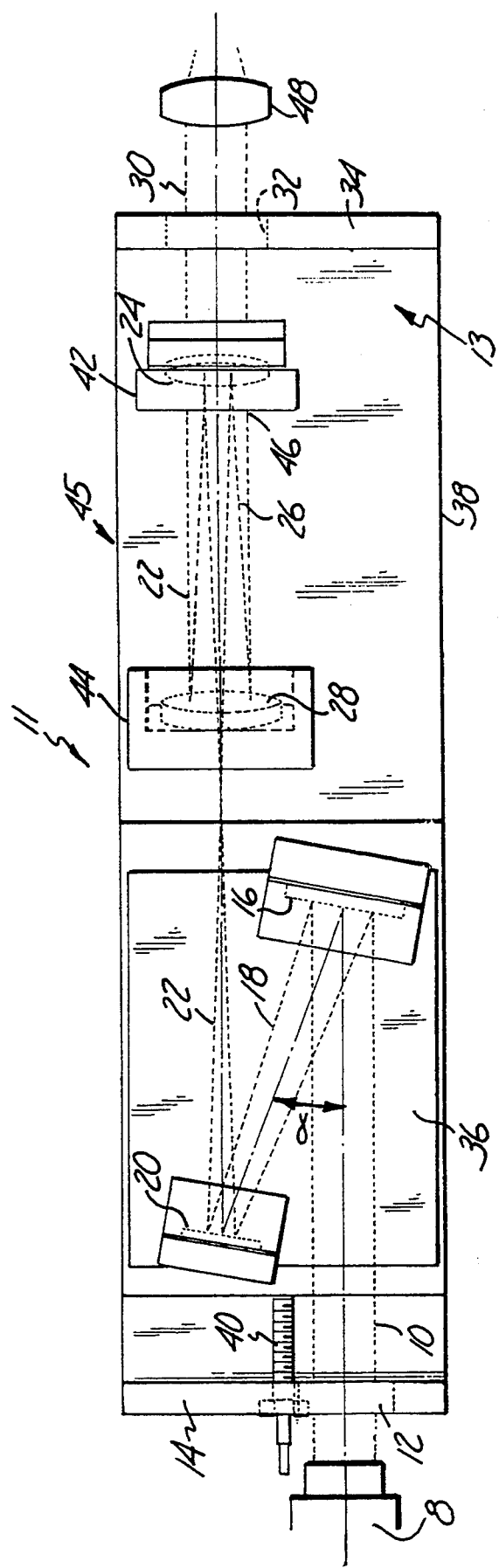
FIG. 1 is a top view of the present invention.

As illustrated in FIGS. 1 and 2, the present invention is a reflective collimator 11 that collimates an input laser beam 10, producing an output laser beam 30. The reflective collimator 11 adjusts the divergence of input laser beam 10, and controls beam spread of output laser beam 30.

The reflective collimator 11 preferably includes a housing 13 having a base 38, a front side wall 14, and a back side wall 34. A beam input window 12 is disposed in side wall 14, and a beam output window 32 is disposed in side wall 34. A rail structure 37 is attached to the base 38. A movable unit 36 slides on rail structure 37. A lead screw 40 is mounted through side wall 14 and engages unit 36. A spherical concave mirror 16 and a flat mirror 20 are mounted on movable unit 36. First and second stationary supports 42 and 44 also are attached to the base 38. A stationary unit 45 comprises supports 42 and 44. A flat mirror 24 is mounted on support 42, and a spherical concave mirror 28 is mounted on support 44. A beam window 46 is disposed in support 42.

A laser source 8 projects input laser beam 10, which enters the reflective collimator 11 through window opening 12 of side wall 14. Laser beam 10 is first reflected and focused by spherical concave mirror 16 to form a focusing beam 18. Flat mirror 20 reflects focusing beam 18 to a path 22 that is substantially parallel to input laser beam 10. Flat mirror 24 reflects beam 22 to form a beam 26. Spherical concave mirror 28 reflects and focuses laser beam 26 to form output laser beam 30 that is substantially parallel to input laser beam 10. The reflective collimator 11 outputs collimated output beam 30 through window opening 32 of side wall 34 to a focusing element 48.

The present invention is typically intended for high power laser applications. Accordingly, the mirrors selected must be suitable for such high power applications and the particular application environment in which the collimator is being used. A typical choice is to use copper mirrors. Significantly, a major advantage of the present invention is that inexpensive spherical mirrors can be used in the reflective collimator.

Referring to FIG. 1, mirror 16 is positioned at the back end of unit 36 with reference to front side wall 14, and positioned so that the mirror's reflective surface is substantially centered on input laser beam 10. Mirror 16 is then set horizontally off the mirror's optical axis so that input laser beam 10 and beam 18 are at an angle $\alpha$ to one another. Mirror 20 is positioned at the front end of unit 36, and substantially centered on beam 18. Mirror 20 also is set horizontally off the mirror's optical axis so that laser beam 22 is substantially parallel to input laser beam 10. Thus, mirror 16 and mirror 20 are at approximately the same height, and as a result mirrors 16 and 20 intersect a horizontal plane. Unit 36 is moved parallel to input laser beam 10 by rotating lead screw 40, which is threaded through unit 36. Therefore, mirror 16 and mirror 20 are movable as a unit substantially parallel to input laser beam 10 through a horizontal plane. Because mirror 16 and mirror 20 are fixed in their respective positions on unit 36, laser beam 22 will always be substantially parallel to input laser beam 12 regardless of the position of unit 36 with respect to side wall 14. Because any movement of unit 36 that is not parallel to input laser beam 10 produces unwanted distortions in output laser beam 30, unit 36 must be positioned on rail structure 37 such that there is minimal sideways movement of unit 36 as unit 36 slides on rail structure 37. Thus, rail structure 37 and unit 36 must precisely fit together so as not to cause distortions beyond the tolerances of the given collimator.

Referring to FIG. 2, mirror 24 is substantially centered on laser beam 22. Mirror 24 is set vertically off the mirror's optical axis so that laser beam 22 is at an angle $\beta$ to laser beam 26. Angle $\beta$ must be substantially equal to angle $\alpha$ to minimize astigmatism. Mirror 28 is positioned so that the mirror's optical axis is substantially centered on laser beam 26. Mirror 28 also is set vertically off the mirror's optical axis so that output laser beam 30 is substantially parallel to input laser beam 10. Mirror 28 is positioned below mirror 24 at approximately the same height of window 32. In addition, mirror 28 is further from side wall 34 than mirror 24. Consequently, because mirror 24 is higher than mirror 28, window 46 in support 42 is positioned sufficiently in line with mirror 28 to allow output laser beam 30 to pass through to window 32. Mirror 24 and mirror 28 are at different heights, but mirrors 24 and 28 intersect a vertical plane.

If a light beam strikes a lens or a curved mirror at an angle to the optical axis of the lens or curved mirror, then an astigmatism occurs. Astigmatism causes the vertical and the horizontal components of the beam to focus in different places. By placing mirrors 16 and 20 to intersect a horizontal plane and mirrors 24 and 28 to intersect a vertical plane, spherical mirror 16 is off axis horizontally and spherical mirror 28 is off axis vertically. Therefore, the astigmatism effects of mirror 16 and mirror 28 will cancel. On the other hand, if mirrors 16 and 28 were both off axis horizontally or both off axis vertically, the astigmatism effects would be additive. The size of angle $\alpha$ and angle $\beta$ will determine the astigmatism initially caused by spherical mirror 16 and spherical mirror 28 respectively, and angle $\alpha$ and angle $\beta$ are typically set to approximately 20°. However, as long as angle $\alpha$ is equal to angle $\beta$, the exact size of angles $\alpha$ and $\beta$ is not critical because the astigmatism effects cancel instead of add. The astigmatism effects caused by off axis mirrors can also be corrected with the use of more expensive parabolic mirrors instead of spherical mirrors. Nevertheless, the present invention not only solves the astigmatism problem inexpensively with spherical mirrors, but also solves the problem without any complicated off axis correction mechanisms.

In large lasers, beam spread changes with changing power. Significantly, the present invention allows beam spread to be adjusted while a laser is operating. Spherical mirror 16 is moved closer or further from side wall 14 by moving unit 36 as indicated by arrows 41 in FIG. 2, thereby controlling the exact point where input beam 10 is reflected and focused. Thus, as mirror 16 gets closer to side wall 14 the amount of divergence of input beam 10 before being reflected is reduced. In this way, by moving unit 36, beam spread of output laser beam 30 can be adjusted. A range of motion of unit 36 of plus or minus two inches has been sufficient to provide control of plus or minus two milliradians of divergence.

Furthermore, when used with flying optic systems, large lasers have a large variance in beam spread. In one embodiment of the present invention, a control server is used to adjust beam spread of a flying optic system as laser source 8 to focusing element 48 distance continually changes. By using a control server to move unit 36, optimum beam size always occurs at focusing element 48 independent of the distance from laser source 8 to focusing element 48.

Finally, when adjusting the beam spread, the present invention avoids steering of output laser beam 30, thus keeping laser beam 30 centered on focusing element 48. Steering of an output beam of a collimator can occur with either a sideways or an angular translation. Since mirrors 24 and 28 are stationary, mirrors 24 and 28 will not cause any steering of output laser beam 30. Moreover, because laser beam 22 is always substantially parallel to input laser beam 10, output laser beam 30 will not be steered when unit 36 is moved.

Although the present invention has been described with reference to preferred embodiments, workers skilled in the art will recognize that changes may be made in form and detail without departing from the spirit and scope of the invention.

What is claimed is:

1. A reflective collimator for adjusting an input light beam comprising:

first reflective means for adjusting the path of the input light beam, for focusing the input light beam, and for reflecting the input light beam to second reflective means;

second reflective means for reflecting the light beam from the first reflective means to third reflective means;

third reflective means for reflecting the light beam from the second reflective means to fourth reflective means; and fourth reflective means for adjusting the path and focus of the light beam and for reflecting the input light beam from the third reflective means to produce a substantially parallel output light beam parallel to the direction of the input light beam.

2. The collimator according to claim 1 wherein the first reflective means is a first spherical concave mirror.

3. The collimator according to claim 2 wherein the second reflective means is a first flat mirror.

4. The collimator according to claim 3 wherein the third reflective means is a second flat mirror.

5. The collimator according to claim 4 wherein the fourth reflective means is a second spherical concave mirror.

6. The collimator according to claim 5 wherein the first spherical concave mirror and the first flat mirror intersect a first plane.

7. The collimator according to claim 6 wherein the second spherical concave mirror and the second flat mirror intersect a second plane.

8. The collimator according to claim 7 wherein the first plane and the second plane are at approximately a 90° angle to each other to minimize astigmatism effects caused by the first spherical concave mirror and the second spherical concave mirror.

9. The collimator according to claim 7 wherein the first spherical concave mirror and the first flat mirror are attached to a movable unit.

10. The collimator according to claim 9 wherein the second spherical concave mirror and the second flat mirror are attached to a stationary unit.

11. The collimator according to claim 10 wherein the movable unit is movable parallel to the input light beam to allow for adjustment of beam spread.

12. A method to collimate an input light beam comprising:

adjusting the path of the input light beam, focusing the input light beam, and reflecting the input light beam to a first point with a first reflector;

reflecting the light beam from the first point to a second point with a second reflector, the first point located at the second reflector;

reflecting the light beam from the second point to a third point with a third reflector, the second point located at the third reflector; and adjusting the path and focus of the light beam after the second point with a fourth reflector producing an output light beam parallel to the direction of the input light beam, the third point located at the fourth reflector.

13. The method of claim 12 wherein the input light beam is a laser beam.

14. The method of claim 12 further comprising:
   positioning the first reflector and the second reflector to intersect a first plane.

15. The method of claim 14 further comprising:
   positioning the third reflector and the fourth reflector to intersect a second plane.

16. The method of claim 15 further comprising:
positioning the first plane and the second plane at approximately a 90° angle to each other to minimize astigmatism effects caused by the first reflector and the fourth reflector.

17. The method of claim 15 further comprising:
moving the first reflector and the second reflector as a unit parallel to the input light beam while keeping the third reflector and the fourth reflector stationary to allow for adjustment of beam spread.

18. A method to collimate an input light beam comprising:
adjusting the path and spread of the input light beam and reflecting the input light beam to a first point with a first reflector;
reflecting the light beam from the first point to a second point with a second reflector, the first point located at the second reflector;
reflecting the light beam from the second point to a third point with a third reflector, the second point located at the third reflector;
adjusting the path and spread of the light beam after the second point with a fourth reflector producing an output light beam parallel to the direction of the input light beam, the third point located at the fourth reflector;
positioning the first reflector and the second reflector to intersect a first plane;
positioning the third reflector and the fourth reflector to intersect a second plane;
positioning the first plane and the second plane at approximately a 90° angle to each other to minimize astigmatism effects caused by the first reflector and the fourth reflector; and
moving the first reflector and the second reflector as a unit parallel to the input light beam while keeping the third reflector and the fourth reflector stationary to allow for adjustment of beam spread.

* * * * *